United States Patent [19]

Dawson et al.

[11] Patent Number: 5,416,623
[45] Date of Patent: May 16, 1995

[54] OPTICAL COMMUNICATIONS SYSTEM

[75] Inventors: John F. Dawson; Timothy C. Tozer, both of York; Simon M. James, Suffolk, all of England

[73] Assignee: British Telecommunications public limited company, London, England

[21] Appl. No.: 78,244
[22] PCT Filed: Dec. 17, 1991
[86] PCT No.: PCT/GB91/02254
§ 371 Date: Aug. 30, 1993
§ 102(e) Date: Aug. 30, 1993
[87] PCT Pub. No.: WO92/11710
PCT Pub. Date: Jul. 9, 1992

[30] Foreign Application Priority Data

Dec. 20, 1990 [GB] United Kingdom ............... 9027716

[51] Int. Cl.$^6$ ........................................ H04B 10/08
[52] U.S. Cl. ................................ 359/110; 359/152; 371/20.1
[58] Field of Search .............. 359/110, 113, 127, 140, 359/152, 173, 177, 179, 188, 195; 731/20.1, 20.4, 20.5

[56] References Cited

U.S. PATENT DOCUMENTS

| | | | |
|---|---|---|---|
| 4,278,850 | 7/1981 | Sato et al. | 359/110 |
| 4,563,774 | 1/1986 | Gloge | 359/173 |
| 4,911,515 | 3/1990 | So et al. | 319/173 |
| 5,157,652 | 10/1992 | Walker | 319/110 |

FOREIGN PATENT DOCUMENTS

| | | | |
|---|---|---|---|
| 0191626 | 8/1991 | Japan | 359/110 |
| 1145487 | 3/1985 | U.S.S.R. | 359/110 |
| WO80/02834 | 12/1980 | WIPO | |

OTHER PUBLICATIONS

*Electronics Letters,* vol. 16, No. 16, Jul. 31, 1980, pp. 629–630.
*Patent Abstracts of Japan,* vol. 5, No. 63 (E-54)[735], Apr. 28, 1981.
PCT Search Report.

*Primary Examiner*—David K. Moore
*Assistant Examiner*—K. Negash
*Attorney, Agent, or Firm*—Nixon & Vanderhye

[57] ABSTRACT

A line monitoring arrangement of an optical fibre communications system carrying system data signals includes a test sequence generator, an optical transmitter and a correlator. The generator generates a sequence of test pulses, and the optical transmitter repeatedly launches the sequence of test pulses into a first end of a transmission line forming part of the communications system. The correlator correlates signals received at the first end of the transmission line with the sequence of test pulses to identify returned test pulse sequences. The test pulse sequences and system data signals are superimposed onto the transmission line.

18 Claims, 3 Drawing Sheets

OPTICAL COMMUNICATIONS SYSTEM

BACKGROUND OF THE INVENTION

1. Field of the Invention

This invention relates to an optical communications system, and in particular to a line monitoring arrangement for early detection of faults in such a system.

2. Related Art

If an installed optical fibre is to be tested for an apparent or suspected fault, the way in which this is presently performed is by utilising an Optical Time Domain Reflectometer (OTDR). An OTDR comprises a pulse source, usually a high power laser, from which a single pulse is launched into the fibre to be tested, and light returning to the launch end of the fibre is monitored. This returned light always includes backscattered light (that is to say light that is reflected back within the fibre's numerical aperture due to Rayleigh scattering) and may include light reflected at fibre discontinuities such as fibre breaks, fibre splices or points in the light path where refractive index differences occur. Falls in the returned light level are indicative of increased attenuation in fibre splices and connectors, and peaks in the returned light level are indicative of reflections from breaks in the fibre. The distance of a given feature from the launch end of the fibre is known from the time delay of the associated return signal. Once a period of time sufficient to receive all detectable returned light has passed, a further pulse may be launched into the fibre. The pulse width may be varied for different dynamic range or resolution requirements.

A particular limitation of using an OTDR of this type is that the optical communications system on the fibre has to be disconnected, or at least discontinued, both to permit the connection of the OTDR, and also to prevent the system and the OTDR signals from interfering with one another. The result of this limitation is that an OTDR tends to be utilised only after a failure occurs, and cannot be used for constant line surveillance simultaneously with data transmission.

The specification of International patent application No. GB90/01250 describes a line monitoring arrangement of an optical fibre communications system carrying system data. The monitoring arrangement comprises a test sequence generator for generating a sequence of test pulses, means for repeatedly launching the sequence of test pulses into a first end of a transmission line forming part of the communications system, and a correlator for correlating signals received at the first end of the transmission line with the delayed sequence of test pulses to identify returned test pulse sequences.

This line monitoring arrangement can be operated, while data is being transmitted, by time multiplexing test pulses along with the system data pulses. Unfortunately, restricting the launch of test pulses in this way limits the processing gain of the monitoring arrangement, and hence its effectiveness.

SUMMARY OF THE INVENTION

The present invention provides a line monitoring arrangement of an optical fibre communications system carrying system data signals, the monitoring arrangement comprising a test sequence generator for generating a sequence of test pulses, an optical transmitter for repeatedly launching the sequence of test pulses into a first end of a transmission line forming part of the communications system, and a correlator for correlating signals received at the first end of the transmission line with the sequence of test pulses to identify returned test pulse sequences, wherein the test pulse sequences and system data signals are superimposed onto the transmission line.

Because the test pulse sequences are superimposed upon the system data, there is considerably less restriction on the launch rate of the test pulse sequences (there being no need to slot in the test pulses between system data pulses), so that this arrangement has good processing gain. This can be maximised by arranging for the optical transmitter to be such that the test pulse sequences are launched continuously into said first end of the transmission line. The processing gain, and hence the sensitivity, of this arrangement is determined by the integration time of the correlator, and this is not constrained by the system data.

In a preferred embodiment, the optical transmitter is such as to launch system data signals into said first end of the transmission line. Alternatively, the arrangement may further comprise a second optical transmitter for launching system data signals into said first end of the transmission line. In this case, the second optical transmitter may be coupled to said first end of the transmission line by means of a directional optical coupler.

Preferably, the arrangement further comprises control means for reducing the energy level of data signals returning to said first end of the transmission line relative to the energy level of the returned test pulse sequences.

Advantageously, the control means is constituted by means for applying asymmetric clipping to the signals input to the correlator, said means being such that the clipping level is slightly higher than the energy level of the returned test pulse sequences. Alternatively, the control means may be constituted by a comparator positioned between said first end of the transmission line and the correlator, and a time delay unit in parallel with the comparator, the comparator having a threshold level which is higher than the energy level of the returned test pulse sequences so that its output is substantially entirely system data signals, and the time delay unit being such that the output of the comparator is aligned with the signals received at said first end of the transmission line in such a manner that the system data signals are subtracted from said received signals, whereby substantially only returned test pulse sequences reach the correlator.

As a further alternative, the control means may be constituted by a non-linear element positioned between said first end of the transmission line and the correlator, the non-linear element being such that the energy level of the returned ignals is increased relative to the energy level of system data signals.

Preferably, the arrangement further comprises an optical receiver for receiving returned test pulse sequences at said first end of the transmission line, and for transmitting resultant electrical signals to the correlator. In a preferred embodiment, the optical receiver is such as to receive system data signals at said first end of the transmission line. Alternatively, the arrangement further comprises a second optical receiver for receiving system data signals at said first end of the transmission line, the second optical receiver being coupled to said first end of the transmission line by means of a directional optical coupler.

Advantageously, the test sequence generator is such as to generate pseudo-random binary sequence (PRBS) pulses at a low signal level so that system data transmission along with the transmission line is substantially unaffected.

The test sequence in the returned light has to be detected against a background not only of noise, as with normal OTDR, but also against backscattered light from the system data, and, in the case of a duplex system, incoming system data transmitted from the distant end of the fibre link. To extract the returned test sequence from the background, a correlation technique is utilised in which the correlator correlates the incoming (returned) signal and a time delayed version of the test sequence to establish the time delay and amplitude of each element of the returned signal whilst greatly reducing the effect of other signals. Since the intensity of the returned test sequence will be low, it is envisaged that the correlation will be performed over many cycles of the test.

Conveniently, the correlator is a digitally-stablised analogue correlator. Preferably, the correlator comprises a PRBS generator, a code shift and stepping control unit, an analogue multiplier circuit, and a digitally-stablised analogue integrate and dump circuit, the code shift and stepping control unit receiving synchronisation and clock inputs from the test sequence generator to synchronise the output of the PRBS generator.

The arrangement may further comprise a computer for displaying and/or recording the output of the correlator.

The invention also provides an optical fibre communications system comprising a transmission line, means for launching system data signals into a first end of the transmission line, and a line monitoring arrangement as defined above.

The invention further provides a method of monitoring an optical fibre transmission line without disrupting system data signals, the method comprising the steps of generating a sequence of test pulses, repeatedly launching the sequence of test pulses into a first end of the transmission line, the test pulse sequences being superimposed with the system data signals, receiving optical signals at the first end of the transmission line, and extracting returned test pulse sequences from the received signals by a correlation procedure.

BRIEF DESCRIPTION OF THE INVENTION

Two forms of duplex optical communications system, each of which is constructed in accordance with the invention, will now be described in detail, by way of example, with reference to the accompanying drawings in which.

DETAILED DESCRIPTION OF EXEMPLARY EMBODIMENTS

Figure 1:
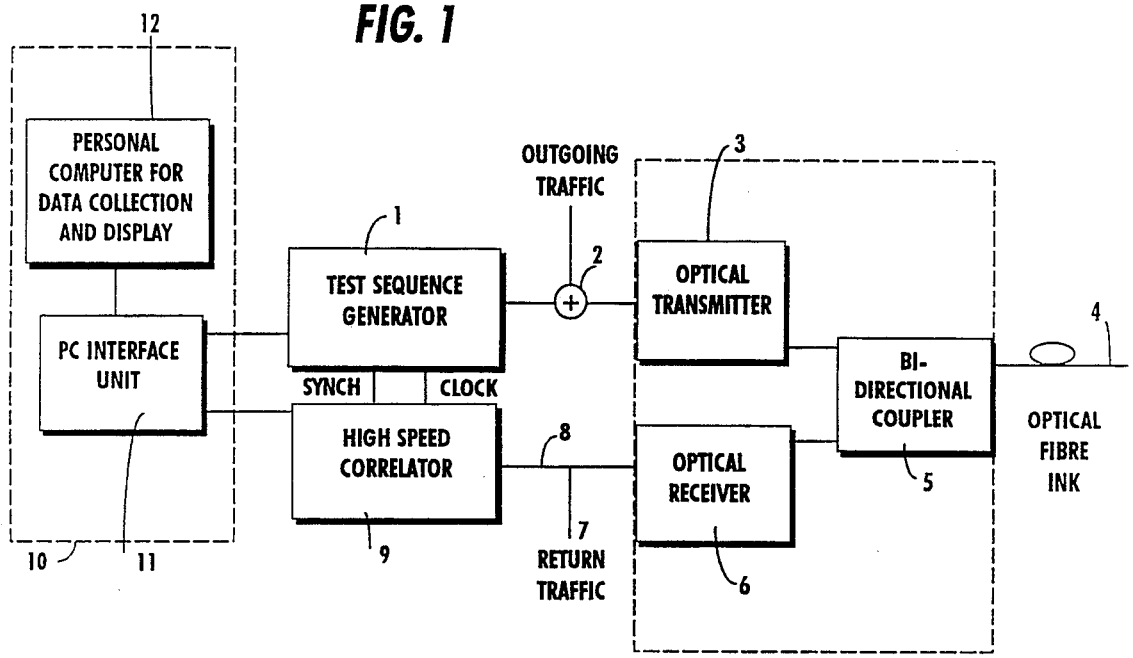
FIG. 1 is a schematic representation of the first form of system.

Referring to the drawings, FIG. 1 shows a line monitoring arrangement including a test sequence generator 1 which provides low-level PRBS pulses which are superimposed, at 2, with system data signals. The combined system data and test sequence is then input to an optical transmitter 3, and launched along an optical fibre link 4 via a bi-directional coupler 5 to an optical receiver (not shown) at the far end of the fibre link. System data in the return direction (which could include a different test sequence) is transmitted from an optical transmitter (not shown) at the far end of the fibre link 4. Thus, signals from the far-end optical transmitter and the backscattered and reflected (returned) light from the signals outbound from the optical transmitter 3, travel towards the first end of the fibre link 4. This light passes through the coupler 5 to an optical receiver 6. This arrangement uses the optical transmitter 3 and the optical receiver 6 of the fibre-optic link being tested to transmit and receive both data and test signals.

The light entering the optical receiver 6 includes relatively high power system data signals transmitted from the far end. Superimposed on these high intensity signals, with no particular synchronism, is the relatively low intensity returned light originating from the transmitter 3. The returned light produces a voltage ripple superimposed on the data signal voltage at the receiver 6. This ripple voltage is of small magnitude compared with the incoming data voltage levels. A comparator (not shown) provided in a data output 7 effectively ignores the ripple voltage, thereby providing a digital output of the data signals. An analogue output of the receiver signal voltage (including the ripple voltage) is fed along a line 8 to a high-speed correlator 9.

The output from the correlator 9 is fed to a control and display unit 10 which includes an interface 11 and a personal computer (PC) 12. The interface 11 is configured to allow the PC 12 to determine the output of the correlator 9, and so can monitor the returned test sequence peaks for change indicative of faults on the fibre link 4.

Figure 3:
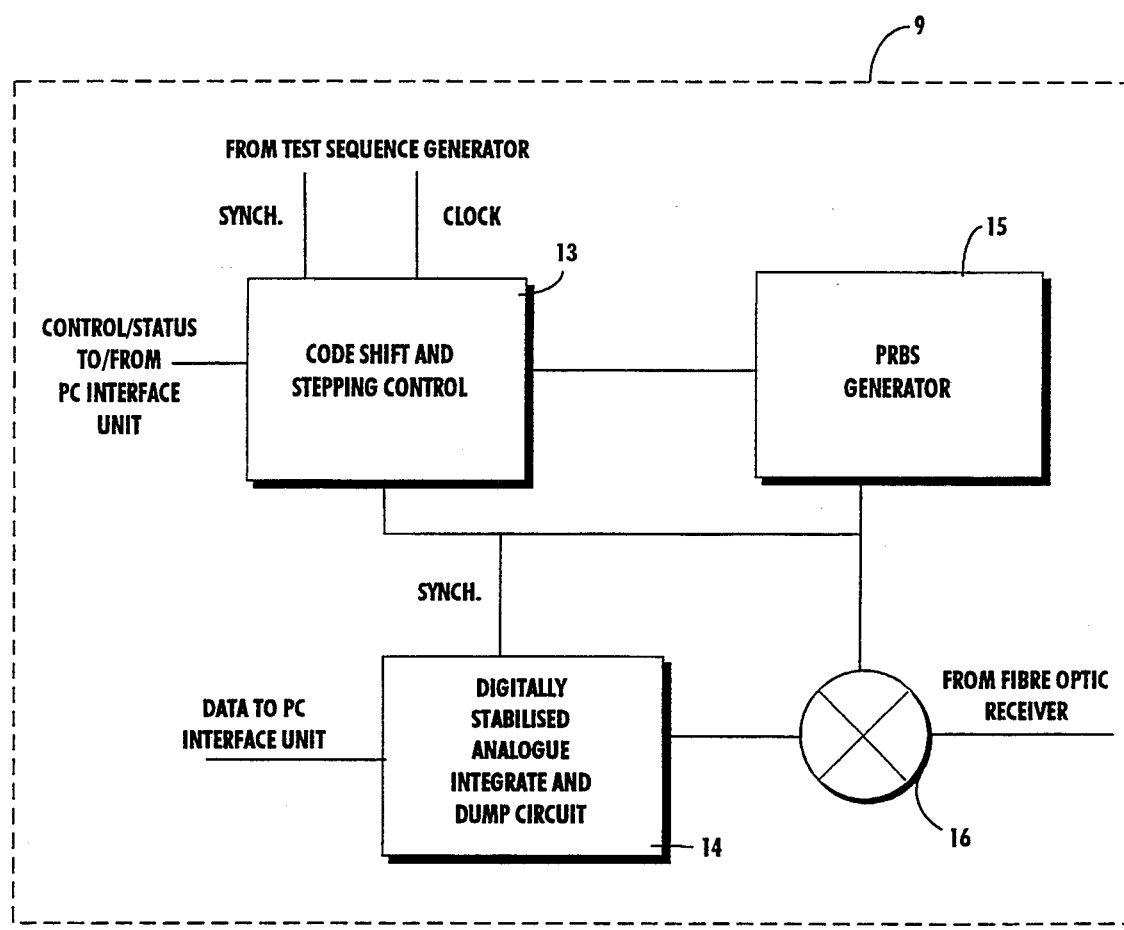
FIG. 3 is a block diagram representation of the correlator which forms part of both systems.

As shown in FIG. 3, the correlator 9 includes a code shift and stepping control 13, a digitally-stablised, analogue integrate and dump circuit 14, a PRBS generator 15 and an analogue multiplier circuit 16. The code shift and stepping control 13 takes a clock signal generated by the test sequence generator at the test sequence chip-rate, and uses it to control the PRBS generator 15 such that it produces an identical PRBS to that of the test sequence generator 1 at the same chip-rate, but shifted in time by an amount determined by the PC interface unit 11. The synch input to the code shift and stepping control 13 from the test sequence generator 1 provides a pulse at the beginning of each sequence transmitted, this pulse being used by the code and shift stepping control as a time reference to which it can synchronise the PRBS generator 15.

The analogue multiplier circuit 16 multiplies the signal from the optical receiver 6 by the time-shifted PRBS generated by the PRBS generator 15. This product is the first part of the correlation process. Incoming returned components of the test sequence generated by the test sequence generator 1 which have the same time shift (delay) as the sequence generated by the PRBS generator 15 will produce a product term which has a non-zero integral over one sequence period. Other signals occuring at the input to the multiplier 16 will cause an output at the multiplier 9 which tends toward a zero average.

The digitally-stablised analogue integrate and dump circuit 14 integrates the output of the multiplier 16 over an integral number of test sequence periods, as determined by the synch signal from the test sequence generator 1, producing an output which is proportional to the level of the returned signals with the same time delay as the PRBS produced by the PRBS generator 15. This correlation process reduces other signals entering the multiplier 16 from the optical receiver 6 by a factor equal to the integration period divided by the chip-period for the test sequence with respect to the returned component with the same time delay as the sequence generated by the PRBS generator 15.

Thus, the position of the test sequence in the returned signal can be located, and the test sequence separated from both the returned system data from the near end of the line 8 and the return data from the far end of the line. Moreover, the level and time delay of the reflections and backscatter from the test sequence can be determined without a knowledge of the form of the system data signals.

Figure 2:
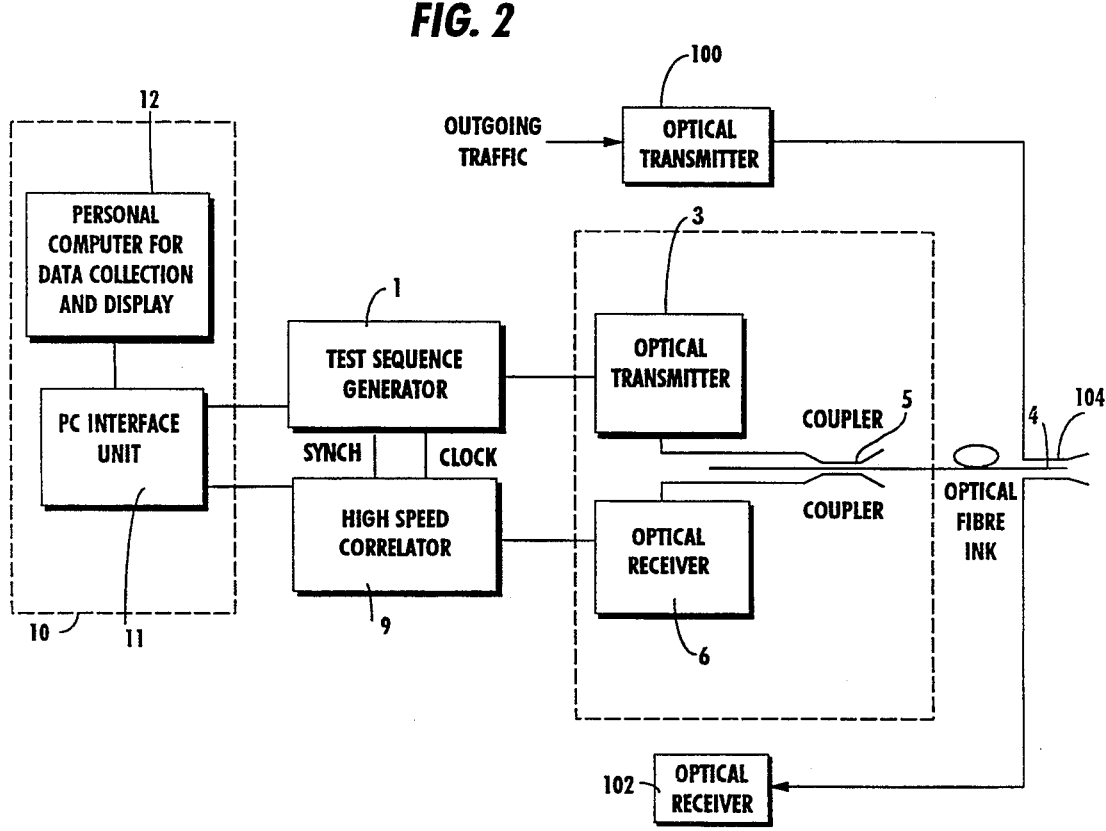
FIG. 2 is a schematic representation of the second form of system.

FIG. 2 shows a line monitoring arrangement which is a modification of that shown in FIG. 1. Consequently, like reference numerals will be used for like parts, and only the modifications will be described in detail. The main modification of the FIG. 2 arrangement is that separate optical transmitters and receivers are used for the data signals and the test sequence. Thus, the optical transmitter 3 and the optical receiver 6 of the FIG. 2 embodiment are used solely for transmitting and receiving test sequence pulses. Data signals are transmitted onto, and received from, the fibre link 4 by means of separate transmitting and receiving apparatus 100, 102 respectively which are connected to the fibre link 4 by means of a directional optical coupler 104.

One of the main factors that limits the performance of the line monitoring arrangements described above with reference to FIGS. 1 to 3 is the large level of incoming traffic when compared with the returned test sequence signal level. Most of the processing gain available is used to overcome this source of noise. Accordingly, if the relative energy level of the incoming traffic signal to the returned test sequence signal can be reduced, then the performance of these line monitoring arrangements could be improved.

Figure 4A:
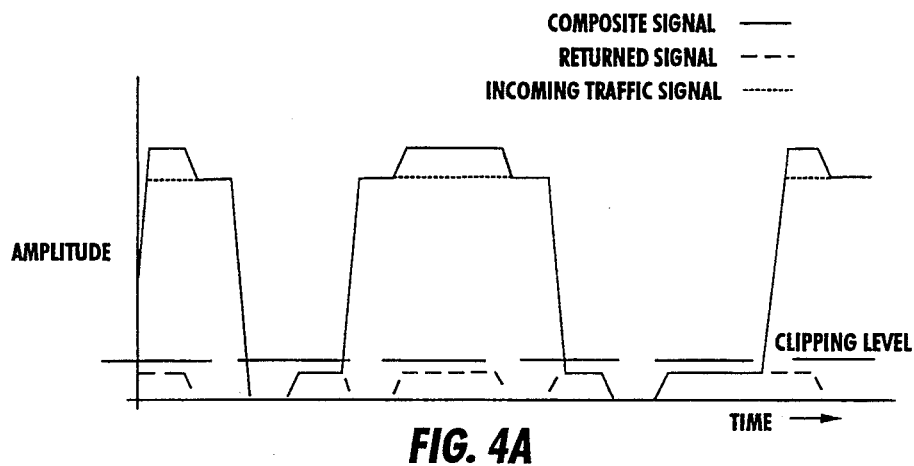
FIGS. 4a and 4b are graphs illustrating how performance enhancement can be achieved by asymmetric clipping.
Figure 4B:
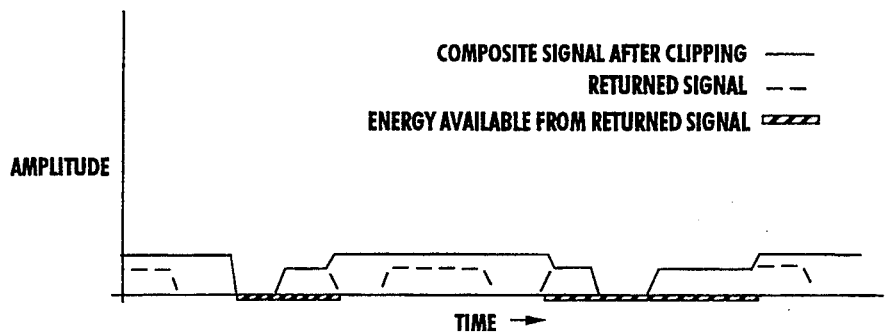

One way of achieving such a performance enhancement is to apply asymmetric clipping to the signals input by the receiver 6 to the correlator 9 of the arrangement of FIG. 1. FIG. 4a is a graph showing the composite signal reaching the correlator 9 in the absence of clipping, as well as the incoming traffic signals and the returned test sequence signals. This figure also shows the clipping level, which is adjusted to be just greater than that of the returned test sequence signals. FIG. 4b is a similar graph to that of FIG. 4a, but shows the composite signal after clipping instead of the composite signal without clipping. It will be apparent that the energy of the incoming traffic signals is reduced to a level which is only slightly larger than that of the returned test sequence signals. This is a significant reduction from an original (before clipping) energy ratio (traffic: returned) of between 60 dB and 100 dB, to a ratio of about 0 dB. With this arrangement, the receiver noise level, which is much smaller than the interference from the traffic signals, becomes the factor limiting the system performance. The use of asymmetric clipping also reduces the returned signal power by half, if it is assumed that both returned and traffic signals have equi-probable mark and space periods. When the traffic signals are above the clipping level, therefore, any elements of the returned return signal are effectively removed (see FIG. 4b).

Figure 5:
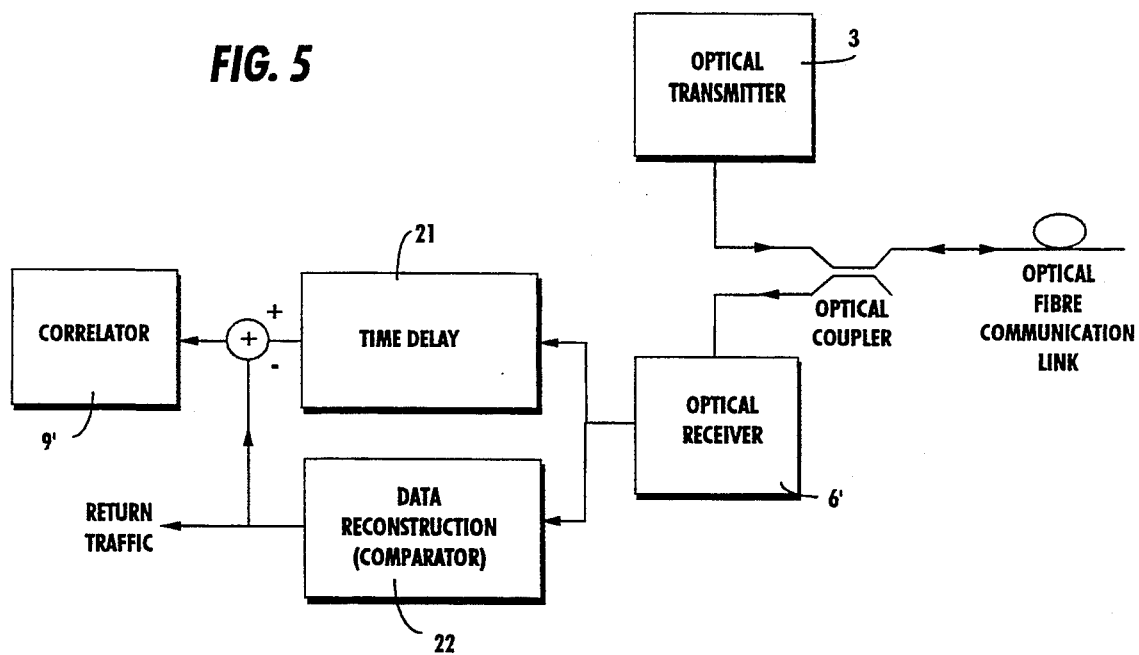
FIG. 5 is a block diagram showing a performance enhancement modification to the system of FIG. 1.

Another way of achieving the desired performance enhancement is to remove substantially completely the high level incoming traffic signals from the input to the correlator 9 of the monitoring arrangement FIG. 1. FIG. 5 shows a circuit modification which accomplishes this. Here, the output of the optical receiver 6 is fed, in parallel, to the correlator 9 via a time delay unit 21 and a comparator 22. The threshold of the comparator 22 is adjusted to remove the returned signals (and any noise) so that the comparator ouput is substantially traffic data only. Clock recovery is also required to select the optimum point (the middle of the traffic bit-period) at which to sample the output of the comparator 22. The time delay unit 21 ensures that the returned test signals are delayed so that the reconstructed traffic data can be correctly aligned, in time, with the output signal from the optical receiver 6, whereby the traffic data signals are subtracted from the output signal of the receiver, so that substantially only returned signals reach the correlator 9.

A further possibility for performance enhancement would be to position a non-linear power law device in the input path to the correlator 9. Such a device would increase the level of the returned test sequence signals reaching the corrlator 9 relative to the level of traffic signals.

Although the methods of performance enhancement outlined above have been described with reference to the monitoring arrangement of FIG. 1, it will be apparent that they are also applicable to the arrangement of FIG. 2. It will also be apparent that other modifications could be made to the arrangements described. For example, a digital correlator could be used instead of the digitally-stablised analogue correlator.

We claim:

1. A line monitoring arrangement for use in an optical fibre communications system while it is also carrying system data signals, the monitoring arrangement comprising:

a test sequence generator means for generating a sequence of test pulses, an optical transmitter means for repeatedly launching the sequence of test pulses into a first end of a transmission line forming part of the communications system and including means for superimposing said system data signals with said test pulses, and means for receiving signals at said first end and for correlating the signals received at the first end of the transmission line with the earlier generated sequence of test pulses to identify returned test pulse sequences reflected from points along said transmission line.

2. An arrangement as in claim 1, wherein the optical transmitter means launches test pulse sequences continuously into said first end of the transmission line.

3. An arrangement as in claim 1, wherein the optical transmitter means launches system data signals into said first end of the transmission line.

4. An arrangement as in claim 1, further comprising a second optical transmitter means for launching system data signals into said first end of the transmission line.

5. An arrangement as in claim 4, wherein the second optical transmitter means is coupled to said first end of the transmission line by a directional optical coupler.

6. An arrangement as in claim 1, wherein said means for receiving and correlating includes control means for reducing the energy level of data signals returning to said first end of the transmission line relative to the energy level of the returned test pulse sequences.

7. An arrangement as in claim 6, wherein the control means includes comparator means for applying asymmetric clipping to the signals input to the means for correlating, said comparator means clipping said signals at a level that is slightly higher than the energy level of the returned test pulse sequences.

8. An arrangement as in claim 6, wherein the control means includes:
   a comparator positioned between said first end of the transmission line and the correlator, and
   a time delay unit in parallel with the comparator,
   the comparator having a threshold level which is higher than the energy level of the returned test pulse sequences so that its output is substantially entirely system data signals, and
   the time delay unit aligning the output of the comparator with the signals received at said first end of the transmission line so that the system data signals are subtracted from said received signals, whereby substantially only returned test pulse sequences reach the correlator.

9. An arrangement as in claim 6, wherein the control means includes a non-linear element positioned between said first end of the transmission line and the correlator, the non-linear element increasing the energy level of the returned signals relative to the energy level of system data signals.

10. An arrangement as in claim 1, further comprising an optical receiver for receiving returned test pulse sequences at said first end of the transmission line, and for transmitting resultant electrical signals to the correlator.

11. An arrangement as in claim 10, wherein the optical receiver receives system data signals at said first end of the transmission line.

12. An arrangement as in claim 10, further comprising a second optical receiver for receiving system data signals at said first end of the transmission line, the second optical receiver being coupled to said first end of the transmission line by a directional optical coupler.

13. An arrangement as in claim 1, wherein the test sequence generator generates PRBS pulses at a low signal level so that system data transmission along the transmission line is substantially unaffected.

14. An arrangement as in claim 1, wherein the correlator includes a digitally-stablised analogue correlator.

15. An arrangement as in claim 14, wherein the correlator comprises:
   a PRBS generator having a control port,
   a code shift and stepping control unit connected to said control port so as to cause said PRBS generator to produce an output identical to that of the test sequence generator means but shifted in time,
   an analogue multiplier circuit connected to receive an output of the PRBS generator and incoming data signals and to produce as an output the product thereof, and
   a digitally-stablised analogue integrate and dump circuit connected to receive the output of said analogue multiplier circuit,
   the core shift and stepping control unit being connected to receive synchronisation and clock inputs from the test sequence generator means to synchronise the output of the PRBS generator.

16. An arrangement as in claim 1, further comprising a computer connected to the output of the correlator for displaying or recording the output of the correlator.

17. An optical fibre communications system comprising:
   a transmission line,
   means for launching system data signals into a first end of the transmission line, and
   a line monitoring arrangement for use in an optical fibre communications system while it is also carrying system data signals, the monitoring arrangement comprising:
      a test sequence generator means for generating a sequence of test pulses,
      an optical transmitter for repeatedly launching the sequence of test pulses into a first end of a transmission line forming part of the communications system and including means for superimposing said system data signals with said test pulses, and
      means for receiving signals at said first end and for correlating the signals received at the first end of the transmission line with the earlier generated sequence of test pulses to identify returned test pulse sequences reflected from points along said transmission line.

18. A method of monitoring an optical fibre transmission line without disrupting system data signals passing thereover, the method comprising steps of:
   generating a sequence of test pulses,
   superimposing said test pulses with system data signals,
   repeatedly launching the superimposed sequence of test pulses and system data signals into a first end of the transmission line,
   receiving optical signals at the first end of the transmission line including test pulses reflected from points along the transmission line, and
   extracting returned test pulse sequences from the received signals by correlation with said sequence of earlier generated test pulses.

* * * * *